(12) United States Patent
Bois et al.

(10) Patent No.: US 9,712,263 B1
(45) Date of Patent: Jul. 18, 2017

(54) BIT ERROR RATIO TESTS

(71) Applicant: Hewlett Packard Enterprise Development LP, Houston, TX (US)

(72) Inventors: Karl J. Bois, Fort Collins, CO (US); Benjamin Toby, Fort Collins, CO (US); David P. Kopp, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/254,098

(22) Filed: Sep. 1, 2016

(51) Int. Cl.
*H04L 1/20* (2006.01)
*H04B 17/336* (2015.01)
*H04L 12/26* (2006.01)

(52) U.S. Cl.
CPC .......... *H04B 17/336* (2015.01); *H04L 43/16* (2013.01)

(58) Field of Classification Search
USPC ........................................ 375/277, 341, 344
See application file for complete search history.

(56) References Cited

U.S. PATENT DOCUMENTS

| | | | | |
|---|---|---|---|---|
| 5,949,832 A | * | 9/1999 | Liebetreu | H04L 1/0001 375/344 |
| 6,735,724 B1 | * | 5/2004 | McClellan | G11B 20/10046 714/704 |
| 8,601,356 B2 | * | 12/2013 | Langenbach | H04L 1/0054 375/262 |
| 2009/0262870 A1 | * | 10/2009 | Ashbrook | H04B 10/2507 375/341 |

OTHER PUBLICATIONS

Justin Redd, Lightwave, Calculating Statistical Confidence Levels for Error-Probability Estimates, Apr. 1, 2000, 9 Pgs.
Unknown, Maxim Integrated, HFTA-010.0: Physical Layer Performance: Testing The Bit Error Ratio (BER), Technical Article HFTA-010.0 (Rev.0, 10/04), 7 Pgs.

* cited by examiner

*Primary Examiner* — Eva Puente
(74) *Attorney, Agent, or Firm* — Hewlett Packard Enterprise Patent Department

(57) ABSTRACT

An example communications device may include a slicer that may generate a digital output signal by thresholding a received signal according to variably set timing and voltage parameters. Testing circuitry may determine expected bit error ratios for multiple time-voltage slices by performing test operations corresponding respectively to the multiple time-voltage slices. Each of the test operations may include setting the timing and voltage parameters of the slicer based on the corresponding time-voltage slice, periodically measuring a bit error ratio based on the digital output signal and determining a confidence level for the measured bit error ratio, and in response to the determined confidence level equaling or exceeding a specified value, designating a current value of the measured bit-error ratio as the expected bit error ratio for the corresponding time-voltage slice and ending the test operation.

20 Claims, 5 Drawing Sheets

BIT ERROR RATIO TESTS

BACKGROUND

A communication device may detect bits of a received signal by comparing the received signal to a threshold voltage at sample timings. The combination of sample timing and threshold voltage that is used in detecting the bits may be referred to as a time/voltage slice, and the device that does the detecting may be referred to as a slicer. The accuracy of the slicer in resolving bits in the received signal may depend on the time/voltage slice that the slicer is set to use. A margining operation may be used to, among other things, help determine which time/voltage slice is the best for the slicer to use during communications. The margining operation may include performing a bit error ratio (BER) test for multiple time/voltage slices, which may determine a BER estimate for each of the tested time/voltage slices. The BER estimates may then be used to, among other things, identify a time/voltage slice for the slicer to use during communications.

DETAILED DESCRIPTION

Some time/voltage slices that a slicer might use are more likely to result in errors than other time/voltage slices. In general, time/voltage slices that are in regions in a time-voltage graph that are likely to be traced by the signal tend to result in errors more frequently than time/voltage slices that are further from these regions. However, it may not be known in advance which time/voltage slices are going to be in low-error regions. Thus, the margining operation may be performed in order to identify high error time/voltage slices and low error time/voltage slices.

The margining operation may include determining estimated BERs for multiple time/voltage slices. The estimated BER for a given time/voltage slice may be an estimate of the true (statistically expected) bit error ratio for that time/voltage slice. The estimated BERs for the time/voltage slices may be determined by performing a BER test for each of the time/voltage slices in question. Once estimated BERs have been determined for a number of time/voltage slices, different regions that correspond to different BERs may be identified. For example, a statistical eye diagram may be constructed, which associates BERs with time/voltage slices. In certain examples, the statistical eye diagram may be constructed by interpolation from the estimated BERs or by other data fitting techniques. The statistical eye diagram may include BER curves that have been fitted to the estimated BERs, with each point on a BER curve having the same BER.

Figure 4:
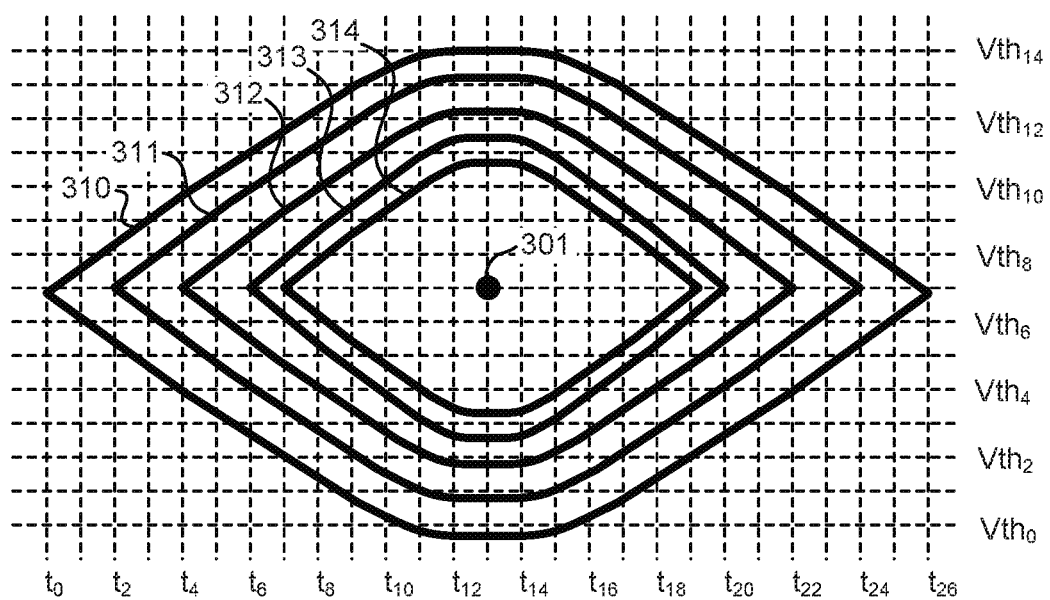
FIG. 4 is a graph illustrating example time/voltage slices and an example statistical eye diagram.

For example, FIG. 4 illustrates an example of a statistical eye diagram, which includes BER curves 310-314. In FIG. 4, a horizontal axis represents time, a vertical axis represents voltage, sample timings $t_0$-$t_{26}$ are illustrated with vertical dashed lines, and threshold voltages $Vth_0$-$Vth_{14}$ are illustrated with dashed horizontal lines. Each intersection of a horizontal line and a vertical dashed line corresponds to a time/voltage slice. In the example, BER curve 310 has the highest (i.e., worst) BER out of those illustrated and BER curve 314 has the lowest (i.e., best) BER out of those illustrated, From such a statistical eye diagram, a time/voltage slice that has a desirable BER, such as the time/voltage slice 301, may be determined.

As noted above, the estimated BERs that are used in the margining operation may be obtained by performing a BER test for multiple time/voltage slices. The performance of the BER test for a given time/voltage slice may include having the slicer detect bits of a test signal at the given time/voltage slice. The detected bits may be compared to trusted bits to detect if there have been any errors. Errors and bits may be counted as the test proceeds, and when the test is ended a value that is equal to the number of errors actually detected during the test divided by the total number of bits received during the test may be used as the estimated BER for the given time/voltage slice.

In particular, the true (statistically expected) BER for an i-th time/voltage slice ($S_i$) may be represented herein as $E\_BER_i$, the estimated BER that is used in the margining operation as an estimate of $E\_BER_i$ may be represented herein as $BER_i$, and a measured bit error ratio may be represented herein as $\widehat{BER}_i$. The value of $\widehat{BER}_i$ may be updated each time that the bit error ratio is measured, with a value of $\widehat{BER}_i$ upon a measurement being equal to $$\frac{E_i}{N_i},$$

where $E_i$ is the number of errors detected thus far during the test for $S_i$ and $N_i$ is the total number of bits received thus far during the test for $S_i$. In certain examples, the estimated $BER_i$ that is used in the margining operation for $S_i$ may be set equal to the current value of $\widehat{BER}_i$ at the time when the test for $S_i$ is ended.

When the estimated $BER_i$ is determined based on the measured $\widehat{BER}_i$, the accuracy of the estimated $BER_i$ may depend on how large $N_i$ and/or how large $E_i$ are ("accuracy" in this context refers to how good of an estimate $BER_i$ is for the true $E\_BER_i$). In particular, as $N_i$ gets larger, $E\_BER_i$ is more and more likely to be equal to $\widehat{BER}_i$. More precisely, as $N_i$ gets larger $E\_BER_i$ is more and more likely to be found within some range that is associated with $\widehat{BER}_i$.

Thus, in order to increase the accuracy of each estimated $BER_i$, in some approaches a large number of bits $N_i$ may be used in each BER test. For example, in some approaches a parameter X may be set in advance to some large value, and, for each time/voltage slice, the BER test operation is continued until $N_i$ reaches the value of X, at which point the test for the current time/voltage slice may be ended and the next test begun. In other words, in these approaches $N_i$=X may be used as a necessary and sufficient exit criterion for the BER tests. These approaches may be referred to hereinafter as the "minimum-N approaches". In the minimum-N approaches the parameter X is often set to a large value (e.g. $10^{12}$) in the hopes of thereby guaranteeing sufficiently accurate estimated $BER_i$.

A potential difficulty associated with the margining operation is that it might take a very long time to complete. In particular; the duration of the margining operation may be proportional to the average number of bits that are used per test. If the number of bits per test is relatively large, the duration of the margining operation may be relatively long. In the minimum-N approaches, the average number of bits per test is equal to X, which is usually a very large value; thus, in the minimum-N approaches the duration of the margining operation may be relatively long.

Thus, in certain examples disclosed herein, instead of continuing to test each time/voltage slice until $N_i = X$, under certain conditions the BER test may be cut short (i.e., the test may be ended before $N_i = X$). In particular, the BER test for a given time/voltage slice may be ended if the accuracy of a current measured $\widehat{BER}_i$ is sufficiently high, regardless of whether $N_i$ has reached X. For example, $\widehat{BER}_i$ may be dynamically measured throughout performance of the test and a confidence level $CL_i$ for the currently measured $\widehat{BER}_i$ may be periodically determined, and if $CL_i$ meets/exceeds some specified threshold Y the test for the i-th time/voltage slice may be ended. Thus, in these examples, $CL_i \geq Y$ may be introduced as an exit criterion for the BER tests. The confidence level $CL_i$ is a quantitative measure of how good of an estimate the currently measured $\widehat{BER}_i$ is for $E\_BER_i$. In certain examples, different values for Y may be used for different time/voltage slices. The threshold Y may be set to any value between 0 and 1 (0% and 100%), according to a desired level of confidence for the particular application. In certain examples; Y may be set to 95%. In certain examples Y may be set to 99%, In certain examples Y may be set to 99.5%.

For some time/voltage slices, the confidence level $CL_i$ may reach the threshold Y when $N_i$ is less than X. In particular, time/voltage slices that are relatively noisy (i.e., large number of errors $E_i$) may result in measured $\widehat{BER}_i$ that have high confidence levels $CL_i$ even with $N_i \ll X$. Thus, using $CL_i \geq Y$ as an exit-criterion for the BER tests may greatly reduce the duration of the BER tests for such time/voltage slices as compared to the minimum-N approach, which in turn may contribute to decreasing the overall duration of the margining operation.

Moreover, since using $CL_i \geq Y$ as an exit-criterion for the BER tests only cuts short the test if a minimum acceptable level of accuracy has been reached, there is no danger that any tests that were cut short by this exit criterion will result in estimated $BER_i$ with an unacceptable accuracy. This is in contrast to attempting to decrease test duration by using a smaller value of X in a minimum-N approach, which may result in some estimated $BER_i$ having unacceptable accuracy.

The $CL_i \geq Y$ exit criterion need not be the only exit criterion that is used in the BER tests. In particular, the $CL_i \geq Y$ exit criterion may be combined with any number of exit criteria. The exit criteria used in the BER test may each be classified as independently sufficient, collectively sufficient, necessary, or any combination of these, and combinations and permutations of such types of exit criteria may be used. An independently sufficient exit criterion is a criterion whose satisfaction is independently sufficient to cause the test to be ended. A group of collectively sufficient exit criteria may be such that satisfaction of all of the criteria in the group results in the test being ended, while satisfaction of less than all of the criteria in the group might not result in the test being ended. A necessary exit criterion is one that must be satisfied before the test may be ended (whether or not satisfaction of the necessary criterion by itself will result in ending the test would depend on whether the necessary criterion happens to also be a sufficient criterion).

In certain examples, the $CL_i \geq Y$ exit criterion may be an independently sufficient exit criterion. In such examples, if $CL_i \geq Y$ the test is ended regardless of whether any other criterion is met. In some of these examples, additional independently sufficient exit criteria (or group of collectively sufficient criteria) may also be used, such as an $N_i = X$ exit criterion; in such examples, the test is ended as soon as the first sufficient criterion (or group of collectively sufficient criteria) is satisfied.

In certain examples, $CL_i \geq Y$ may be part of a group of collectively sufficient exit criteria. In such examples, a test might not be ended even if $CL_i$ is greater than Y if one of the other criterion in the group has not yet met; however, once all of the criteria in the group have been met the test may be ended. For example, a group of collectively sufficient exit criteria may include both $CL_i \geq Y$ and $E_i \geq Z$, where Z is a minimum value for $E_i$; in such examples $CL_i$ being greater than Y results in the test ending only if $E_i$ is also greater than Z. If $CL_i \geq Y$ is part of a group of collectively sufficient exit criteria, one or more of the criteria in the group may also be necessary exit criteria.

In certain examples, $CL_i \geq Y$ may be a necessary exit criteria. In such examples, a test cannot be ended until $CL_i$ is equal to or greater than Y, regardless of whether other criteria have been met. In some of these examples, $CL_i \geq Y$ may be an independently sufficient and necessary exit criteria. In some others of these examples, $CL_i \geq Y$ may be a necessary criterion and also a part of a group of collectively sufficient exit criteria.

In certain examples, if the test for a given time/voltage slice is ended before $CL_i \geq Y$ as a result of some other sufficient criterion being satisfied (such as $N_i = X$), then the estimated $BER_i$ might be disregarded in a margining operation since the estimated BER may not be of sufficient accuracy. In certain examples, if the test for a given time/voltage slice is ended before $CL_i \geq Y$ as a result of some other sufficient criterion being satisfied, the estimated $BER_i$ might still be used in the margining operation despite having accuracy lower than might be desired. In certain examples if the test for a given time/voltage slice is ended before $CL_i \geq Y$ as a result of some other sufficient criterion being satisfied, then the current value of $CL_i$ may be output and/or stored in association with $BER_i$.

[I. Example System]

Figure 1:
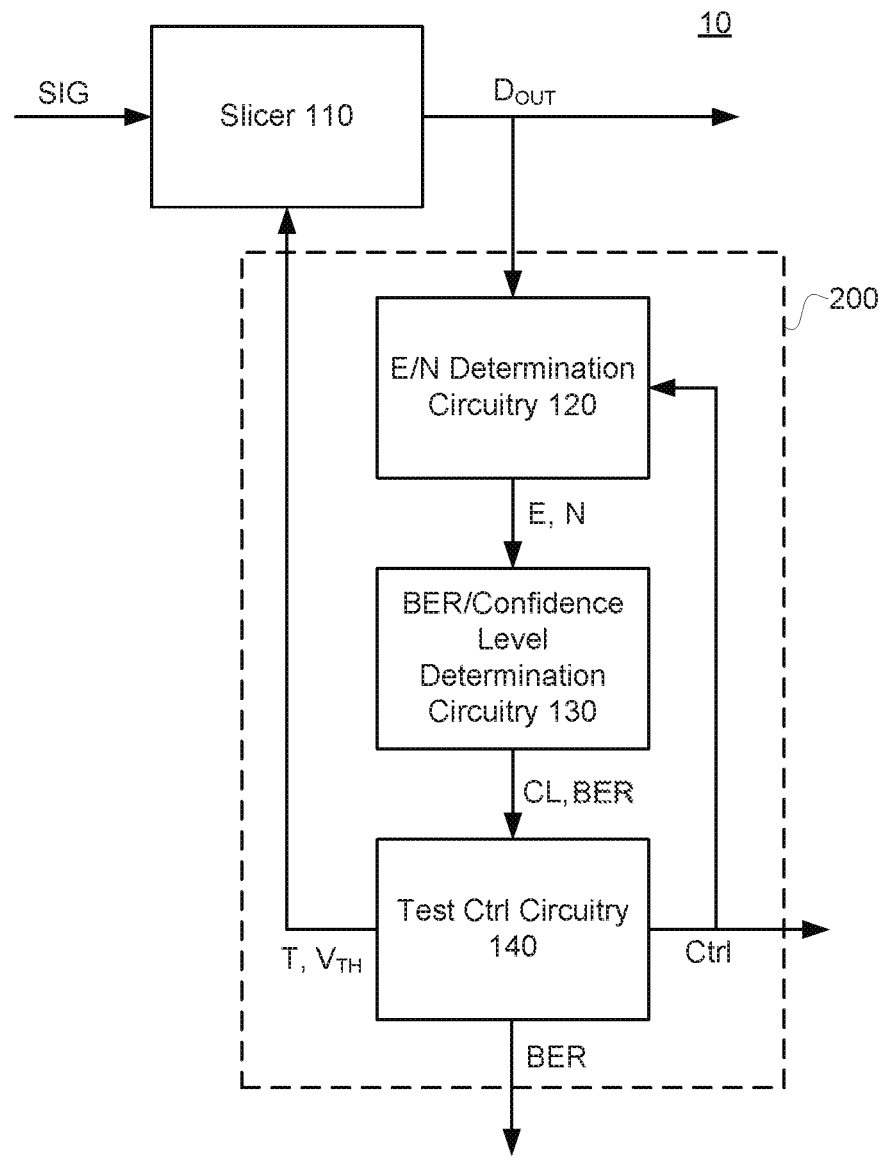
FIG. 1 is a block diagram illustrating an example system including a slicer and testing circuitry.

FIG. 1 illustrates an example system 10. The example system 10 may include a slicer 110 and testing circuitry 200, The testing circuitry 200 may include E/N determination circuitry 120, BER/confidence level determination circuitry 130, and test control circuitry 140. The testing circuitry 200 may control performance of a margining operation, including controlling BER test operations.

In certain examples, the slicer 110 and the testing circuitry 200 may both be part of the same communications device; in such examples, the testing circuitry 200 may be referred to as "integrated" testing circuitry and the BER tests performed thereby may be referred to as integrated BER tests (IBERTs), In certain of these examples, the slicer 110 and the testing circuitry 200 may be formed as part of the same integrated circuit as one another. In certain other examples, the slicer 110 and the testing circuitry 200 may be part of separate devices that are communicably connected; for example, the slicer 110 may be part of a communications device and the testing circuitry 200 may be part of a testing device that is connected to the communications device to perform the BER tests.

[I. A. Example Slicer]

The slicer 110 may threshold a received signal SIG according to variably set timing and voltage parameters (T, $V_{TH}$), and thereby generate a digital output signal $D_{OUT}$. When "threshold" is used herein as a verb, it means to compare a signal to a threshold voltage at sample timings and generate a digital output based on the result of the comparison. The sample timings at which the slicer 110 thresholds the received signal SIG may be controlled with the timing parameter T. The threshold that the slicer 110 compares the received signal SIG to may be controlled with the voltage parameter $V_{TH}$. Each distinct combination of settings for the timing and voltage parameters T and $V_{TH}$ is a distinct time/voltage slice.

The slicer 110 may have any known architecture. For example, the slicer 110 may include a comparator that compares the received signal SIG (or a signal that is based thereon) to a threshold voltage, and outputs a first digital value if the received signal SIG is above the threshold voltage and a second digital value if the received signal SIG is below the threshold voltage. In such an example, the timing parameter T may control a phase of a clock signal CLK that controls sample timings of the comparator and the voltage parameter $V_{TH}$ may control the threshold voltage of the comparator. In certain examples, the slicer 110 may further include, for example, a sample-and-hold circuit that samples the received signal SIG and outputs the sampled value to the comparator, an amplifier that amplifies the received signal SIG, additional comparators, demux stages, decoders, registers, and so on. For simplicity, the example illustrated in FIG. 1 shows one slicer 110, but it should be understood that the system 10 could include any number of slicers 110. In certain examples, the received signal SIG may have two distinct signal levels (such as a non-return to zero (NRZ) signal), in which case a single slicer 110 may be sufficient to threshold the received signal. In certain other examples, the received signal SIG may have more than two distinct signal levels (such as a four level pulse amplitude modulation (PAM-4) signal), in which case the system 10 may include multiple instances of the slicer 110 to threshold the received signal SIG. For example, when the received signal SIG is a PAM-4 signal the system 10 may include three slicers 110 for data detection, which each threshold the received signal SIG at different threshold voltages (additional slicers for edge detection may also be included); in such a case, the voltage parameter $V_{TH}$ may be a multi-valued parameter that includes distinct voltage settings for each of the slicers 110.

As noted above, in certain examples the timing parameter T may control a phase of a clock signal CLK, and sample timings may corresponds to specific portions of a waveform of CLK, such as rising edges, falling edges, both rising and falling edges, etc. The clock signal CLK may be such that its frequency $f_{CLK}$ corresponds to a frequency $f_{DATA}$ of data periods in the received signal SIG. The frequency $f_{CLK}$ may be made to match $f_{DATA}$ by, for example, exploiting foreknowledge of $f_{DATA}$, employing a clock-and-data recovery (CDR) technique, and/or the like.

[I. B. Example Testing Circuity]

The testing circuitry 200 is described herein in terms of separate sub-components merely for ease of description, and this should not be understood to imply that each of the components of the testing circuitry 200 is necessarily physically distinct from the others, Instead, some (or all) of the aforementioned components may share certain physical structures with some (or all) of the other components. Thus, operations that may be described herein as being performed by different ones of the aforementioned components may ultimately be performed by the same physical structure or collection of structures. In particular, the testing circuitry 200 may be implemented via logic circuits, processing circuitry (such as central processing units (CPUs), microprocessors, microcontroller devices, digital signal processors (DSPs), etc.) executing machine readable instructions stored in non-transitory machine readable media, application-specific integrated circuits (ASICs), field-programmable gate arrays (FPGAs), application-specific instruction set processors (ASIPs), and/or the like, in any combination. Thus, each of the E/N determination circuitry 120, BER/confidence level determination circuitry 130, and test control circuitry 140 may be implemented by any combination of the aforementioned physical structures, some of which may be shared. More detailed examples of these sub-components of the testing circuitry 200 will be described below.

Figure 2:
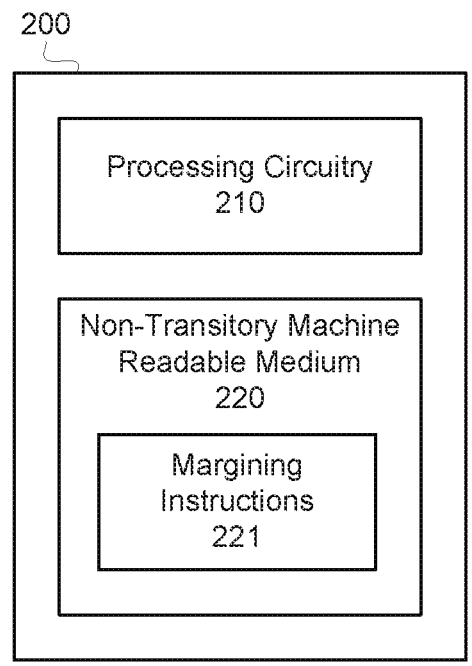
FIG. 2 is a block diagram illustrating example testing circuitry.
Figure 3:
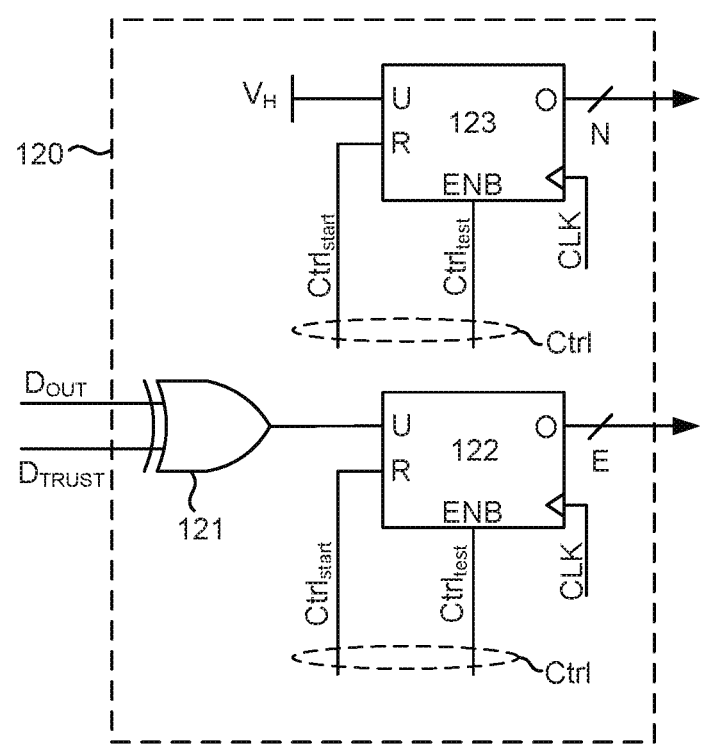
FIG. 3 is a block diagram illustrating example E/N determination circuitry.

For example, FIG. 2 illustrates one example of the testing circuitry 200 that includes processing circuitry 210 and non-transitory machine readable medium 220, which stores machine readable instructions including margining instructions 221. The margining instructions 221 may include instructions that, when executed by the processing circuitry 210, cause the processing circuitry to perform some or all of the operations described herein as being performed by the testing circuitry 200. The non-transitory machine readable medium 220 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.).

As noted above, the testing circuitry 200 may include E/N determination circuitry 120, BER/confidence level determination circuitry 130, and test control circuitry 140. The E/N determination circuitry 120 may detect errors in the signal $D_{OUT}$ that is output from the slicer 110, count the number of errors that have been detected thus far during a current BER test ($E_i$), and count the total number of bits received by the slicer 110 thus far during the current BER test ($N_i$). The BER/confidence level determination circuitry 130 may periodically measure $\overline{BER}_i$ and periodically calculate a confidence level $CL_i$ for the current value of $\overline{BER}_i$ based on the values $E_i$ and $N_i$ that are output by the E/N determination circuitry 120. The test control circuitry 140 may control the BER test operations, including controlling starting and stopping of a BER test for a time/voltage slice, setting values for the timing and voltage parameters T and $V_{TH}$, and determining whether the confidence level $CL_i$ meets or exceeds a threshold value Y. When $CL_i \geq Y$, the test control circuitry 140 may end the current BER test. At the end of a BER test, the test control circuitry 140 may output a current value of the measured $\overline{BER}_i$ to be used as an estimated BER; for a margining operation.

[I. B. i. Example E/N Determination Circuitry]

The E/N determination circuitry 120 may detect errors in $D_{OUT}$ by comparing bits of $D_{OUT}$ to corresponding bits from a trusted sequence of bits $D_{TRUST}$. For example, the trusted sequence of bits $D_{TRUST}$ may be identical to a known test sequence $SIG_{TEST}$, and during the BER test operation the known test sequence $SIG_{TEST}$ may be transmitted to the slicer 110 and received as the received signal SIG. Because the n-th bit of $D_{TRUST}$ is identical to the n-th bit of $SIG_{TEST}$, if there has been no error in the transmission/reception of $SIG_{TEST}$ then the n-th bit of $D_{OUT}$ should be the same as the n-th bit of $D_{TRUST}$. Thus, whenever a bit of $D_{OUT}$ differs from its corresponding bit in $D_{TRUST}$, and error is detected. A synchronization sequence may be included in both the test sequence $SIG_{TEST}$ and the trusted sequence of bits $D_{TRUST}$ in order to allow the signals to be synchronized before testing begins so that corresponding bits may be properly compared.

In certain examples, the test sequence $SIG_{TEST}$ may be generated by the test circuitry 200 and communicated to the slicer 110. In other examples, the test sequence $SIG_{TEST}$ may be generated by a separate communication device that is connected to the system 10 and may be communicated thereby to the slicer 110. In examples in which a separate communication device is used, the testing circuitry 200 may communicate with the separate communication device to enable the separate communication device to know when a BER test is to begin and end, to identify which test sequence $SIG_{TEST}$ is to be used (if multiple test sequences are available for use), and so on.

In certain examples, the trusted sequence of bits $D_{TRUST}$ may be stored locally in the test circuitry 200 prior to the test operation, and may be recalled by the E/N determination circuitry 120 for comparison to $D_{OUT}$. In certain examples, the trusted sequence of bits $D_{TRUST}$ may be generated dynamically by the test circuitry 200 as the BER test proceeds, for example by applying an algorithm known to generate the correct sequence of bits. In certain examples, a single signal source may communicate the known test sequence $SIG_{TEST}$ to both the slicer 110 and the E/N determination circuitry 120, and the E/N determination circuitry 120 may treat this signal as the trusted sequence of bits $D_{TRUST}$; in such a case, a communication path over which the test sequence $SIG_{TEST}$ is communicated to the E/N determination circuitry 120 (such as an internal bus) may have sufficient quality that the accuracy of the signal received by the E/N determination circuitry 120 may be trusted.

FIG. 2 illustrates one possible example of the E/N determination circuitry 120 implemented via logic circuits. The example E/N determination circuitry 120 of FIG. 2 includes an XOR gate 121, a counter 122, and a counter 123. The XOR gate 121 receives $D_{OUT}$ and $D_{TRUST}$ as input signals, and outputs a signal according to the exclusive disjunction logical function. In other words, the XOR gate 121 detects errors in $D_{OUT}$ as it compares $D_{OUT}$ and $D_{TRUST}$ and outputs a high signal whenever they are different. The counter 122 receives the output of the XOR gate 121 at its up-count input U, a clock signal CLK at its clock input, and outputs an error count $E_i$. The counter 122 samples the output of the XOR gate each clock pulse and up-counts whenever an error is detected in $D_{OUT}$. The counter 123 receives a constant logical high voltage $V_H$ at its up-count input U, a clock signal CLK at its clock input, and outputs a total bit count $N_i$. Thus, the counter 123 up-counts each clock pulse (since $V_H$ is always high); since $D_{OUT}$ includes one bit per clock pulse, the output $N_i$ corresponds to the number of bits in $D_{OUT}$ since a last time that the counter 123 was reset and began counting. Both the counters 122 and 123 may have a control signal $Ctrl_{start}$ input to their reset inputs R and a control signal $Ctrl_{test}$ input to their enable inputs ENB. The control signals $Ctrl_{start}$ and $Ctrl_{test}$ may be parts of the control signal Ctrl that is output by the test control circuitry 140. The control signal $Ctrl_{start}$ may pulse at the start of a BER test operation, thereby causing the counters 122 and 123 to be reset. The control signal $Ctrl_{test}$ may be high during performance of a BER test operation and low when the BER test operation has ceased, thereby enabling the counters to count during the test operation and disabling the counters from continuing to count when the test operation has ceased.

[I. B. ii. Example BER/Confidence Level Determination Circuitry]

The BER/confidence level determination circuitry 130 may periodically measure $\widehat{BER}_i$ based on the current values of $E_i$ and $N_i$ output from the E/N determination circuitry 120, where $\widehat{BER}_i$ is measured by calculating $$\widehat{BER}_i = \frac{E_i}{N_i}.$$

The BER/confidence level determination circuitry 130 may also periodically determine a confidence level $CL_i$ for the current measured $\widehat{BER}_i$. The timings at which $\widehat{BER}_i$ is measured and at which $CL_i$ are determined do not necessarily need to be the same. In certain examples, $\widehat{BER}_i$ may be measured every g bits and $CL_i$ may be calculated every h bits, where g and h are integer values that are equal to or greater than 1 and that may be, but do not have to be, equal to each other.

As used herein, the "confidence level" of a measured $\widehat{BER}_i$ is any quantitative measure of the likelihood (i.e., probability) that the true (statistically expected) value $E\_BER_i$ is within some specified range of values that is associated with the measured $\widehat{BER}_i$. For example, the range of values may be all BER values that are lower than or equal to the measured $\widehat{BER}_i$; in such a case, the confidence level $CL_i$ may be expressed as $CL_i = P(E\_BER_i \leq \widehat{BER}_i)$, where $P(A)$ is the probability that condition A is true. As another example, the range of values may be all BER values that are greater than or equal to the measured $\widehat{BER}_i$; in such a case, the confidence level $CL_i$ may be expressed as $CL_i = P(E\_BER_i \geq \widehat{BER}_i)$. As another example, the range of values may be all BER values that are within some interval around the measured $\widehat{BER}_i$; in such a case, the confidence level $CL_i$ may be expressed as $CL_i = P(\widehat{BER}_i - \delta \leq E\_BER_i \leq \widehat{BER}_i + \delta)$, where $\delta$ is some specified value.

In certain examples, the confidence level $CL_i$ may be determined via the binomial probability distribution function, with errors $E_i$ being the events of interest and the measured $\widehat{BER}_i$ being used as the probability of an event. Various known equations derived from the binomial distribution function may be used to calculate confidence levels $CL_i$ as a function of $E_i$ and/or $N_i$, with the measured $BER_i$ being used as the individual event probability. Two examples of such equations are described below, but any other such equation could also be used.

For example, if the confidence level is defined as $CL_i = P(E\_BER_i \leq \widehat{BER}_i)$, then one possible formula for the confidence level $CL_i$ may be:

$$CL_i = 1 - \sum_{k=0}^{E_i} \frac{(N_i \cdot \widehat{BER}_i)^k}{k!} e^{-N_i \cdot \widehat{BER}_i} \qquad \text{Eq. (1)}$$

Substituting $$\widehat{BER}_i = \frac{E_i}{N_i}$$

into equation (1) reduces the formula to:

$$CL_i = 1 - \sum_{k=0}^{E_i} \frac{E_i^k}{k!} e^{-E_i} \qquad \text{Eq. (2)}$$

As another example, if the confidence level $CL_i$ is defined as $CL_i = P(\widehat{BER}_i - \delta \leq E\_BER_i \leq \widehat{BER}_i + \delta)$, then the confidence level $CL_i$ may be given from any known formula that relates a confidence level ($CL_i$) to a confidence interval ($\delta$). In some cases, such formulas may treat the confidence interval as a dependent variable and the confidence level as one of the independent variables; however, such formulas may be rearranged to treat confidence level as a dependent variable and confidence interval as one of the independent variables. For example, if the formula for the normal approximation for the confidence interval is used, the confidence level $CL_i$ may be given by the following formula:

$$CL_i = 2z^{-1}\left(\frac{\delta}{\sqrt{\frac{\widehat{BER}_i}{N_i}(1-\widehat{BER}_i)}}\right) - 1 \qquad \text{Eq. (3)}$$

where $\delta$ is a specified confidence interval and $z^{-1}(\ )$ is a function defined such that if $z^{-1}(x)=y$, then $z_y=x$, where $z_y$ is the y-th quintile of the normal probability distribution. Substituting $$\widehat{BER}_i = \frac{E_i}{N_i}$$

into equation (3) reduces the formula to:

$$CL_i = 2z^{-1}\left(\frac{\delta}{\sqrt{\frac{E_i}{N_i^2}\left(1-\frac{E_i}{N_i}\right)}}\right) - 1$$

When equation 2 is used to calculate the confidence level $CL_i$, the confidence level $CL_i$ may be dependent only on the number of errors $E_i$ and may be independent of the number of bits $N_i$. However, implicit in equations 1 and 2 are certain assumptions, including that $E_i$ is larger than one. Accordingly, in certain examples; the confidence level $CL_i$ may be calculated using equation 2 only after $E_i$ exceeds one. Furthermore, in certain examples in which equation 2 is used to calculate $CL_i$, the confidence level $CL_i$ may be calculated only after $N_i$ exceeds a specified value Z, or the confidence level $CL_i$ may be calculated using some other formula prior to $N_i$ reaching Z, or the BER test may be prevented from ending before $N_i$ reaches Z (regardless of what the confidence level $CL_i$ is). The specified value Z may be much less than the typical values of X that may be used in the minimum-N approaches. For example, Z may be on the order of $10^5$.

In certain examples, digital arithmetic circuitry may divide the current value of $E_i$ by the current value of $N_i$ and output the result as $\widehat{BER}_i$. In certain examples, processing circuitry executing machine-readable instructions may divide the current value of $E_i$ by the current value of $N_i$ and output the result as $\widehat{BER}_i$.

In certain examples, the determination of $CL_i$ may be accomplished by on-the-fly calculations using analytical or numeric solutions to specified mathematical formulas (such as equation 2). In certain examples, digital arithmetic circuitry may calculate the confidence level $CL_i$ on-the-fly based on $E_i$ and/or $N_i$. In certain examples, processing circuitry executing machine-readable instructions may calculate the confidence level $CL_i$ on-the-fly based on $E_i$ and/or $N_i$. In certain examples, the determination of $CL_i$ may be accomplished by referencing a lookup table in which values for $CL_i$ that have been calculated in advance have been stored. Such referencing of a lookup table may be accomplished by processing circuitry executing machine-readable instructions, or by dedicated hardware. For example, multiple values of $E_i$ may be stored in a table, each in association with a corresponding value of $CL_i$, were the corresponding value of $CL_i$ for each value of $E_i$ was determined via equation 2; in such an example, the BER/confidence level determination circuitry 130 may determine a confidence level $CL_i$ based on a measured value of $E_i$ by searching the table based on the measured value $E_i$ and retrieving the $CL_i$ value that is associated with the measured value $E_i$ in the table.

When references are made herein to determining or calculating or measuring a bit error ratio or $\widehat{BER}_i$, such references include both directly measuring the $\widehat{BER}_i$ by dividing the current measured value of $E_i$ by the current measured value of $N_i$ and indirectly measuring the $\widehat{BER}_i$ by measuring some other value that is causally related to the $\widehat{BER}_i$. For example, a current value of the confidence level $CL_i$ is related to the current value of $\widehat{BER}_i$, with the relation between the two depending on the particular definition of the confidence level $CL_i$ that is being used (see, for example, equation 1). Thus, for example, if equation 2 is used to determination a current value of $CL_i$, this would also qualify as measuring a current value of the $\widehat{BER}_i$ even if no explicit calculation of $E_i/N_i$ is made. In the case of directly measuring the $\widehat{BER}_i$, a specific value for the current $\widehat{BER}_i$ may be output by the BER/confidence level determination circuitry 130 as a result of the measuring, while in the case of indirectly measuring the $\widehat{BER}_i$ it may be the case that no separate value for $\widehat{BER}_i$ is output by the BER/confidence level determination circuitry 130 as a result of the measuring.

[I. B. iii. Example Test Control Circuitry]

As noted above, the test control circuitry 140 may control starting and stopping of a BER test for a given time/voltage slice. At the start of a BER test for a given time/voltage slice, the test control circuitry 140 may set the values of the timing and voltage parameters T and $V_{TH}$ of the slicer 110 based on the given time/voltage slice, cause a test signal $SIG_{TEST}$ to be sent to the slicer 110, and, once $D_{OUT}$ and $D_{TRUST}$ have been synchronized, cause the E/N determination circuitry 120 to start counting $E_i$ and $N_i$. At the end of the BER test for a given time/voltage slice, the test control circuitry 140 may cause the test signal $SIG_{TEST}$ to cease being sent to the slicer 110, may cause the E/N determination circuitry 120 to stop counting $E_i$ and $N_i$, and may output the current value of the measured $\widehat{BER}_i$ as the estimated $BER_i$ that is to be used in the margining operation as an estimate of the true (or statistically expected) value $E\_BER_i$. Thereafter, a test operation for a next time/voltage slice may be begun, and this process may be repeated for each time/voltage slice that is to be tested as part of a margining operation.

The test control circuitry 140 may determine when a current BER test is to be stopped by applying exit criteria. As described above, the examples disclosed herein may use $CL_i \geq Y$ as an exit criterion. Thus, the test control circuitry 140 may determine whether the current value of $CL_i$ that is output by the BER/confidence level determination circuitry 130 is equal to or greater than the specified threshold value Y. As noted above, other exit criteria may also be used in addition to the $CL_i \geq Y$ exit criterion, and the test control circuitry 140 may also determine whether these additional exit criterion (if any) are satisfied. If any independently sufficient exit criteria is satisfied (or if any group of collectively sufficient exit criteria are all satisfied), then the test control circuitry 140 may cause the current BER test to end.

Once a BER test for an n-th time/voltage slice $S_n$ has been stopped, the test control circuitry 140 outputs the current value of the measured $\widehat{BER}_n$ as the estimate $BER_n$, and thereafter starts a BER test for an (n+1)-th time/voltage slice. The test control circuitry 140 may perform the BER test for a plurality of time/voltage slices as part of a margining operation. The estimated $BER_i$ that are output by the test control circuitry 140 may be stored in a storage medium. For example, a margining matrix may be generated that includes cells that each corresponds to a potential time/voltage slice, and the estimated $BER_i$ may each be stored in the cell of its corresponding time/voltage slice. Note that not every possible combination of timing settings and voltage settings is necessarily tested during a margining operation, and therefore some cells of the margining matrix might remain empty.

The test control circuitry 140 may control operations that are performed by other components by sending signals or other messages to those components. For example the test control circuitry 140 may use the control signal Ctrl to signal to other components (both within the system 10 and external to the system 10) that the test operation is to be started or stopped, as well as to control other functions related to the performance of a BER test. In some cases the control signal Ctrl may be communicated directly to the other component, whereas in other cases the control signal may cause other messages to be communicated to the component. The control signal Ctrl may be referred to in the singular form occasionally for simplicity, but in practice the control signal Ctrl may be made up of multiple distinct control signals that each control different functions. For example, the control signal Ctrl may include a control signal $Ctrl_{test}$ that controls counting of the counters 122 and 123, and a control signal $Ctrl_{start}$ that controls resetting of the counters 122 and 123. At the start of a BER test, the test control circuitry 140 may use the control signal $Ctrl_{start}$ to reset counters 122 and 123 and may use the control signal $Ctrl_{test}$ to enable the counting of $E_i$ and $N_i$. At the end of the BER test, the test control circuitry 140 may use the control signal $Ctrl_{test}$ to disable further counting of $E_i$ and $N_i$.

As noted above, the test control circuitry 140 may cause a test signal $SIG_{TEST}$ to be sent to the slicer 110 throughout the test operation. In certain examples, the test control circuitry 140 may itself generate the test signal $SIG_{TEST}$ and communicate it to the slicer 110. In other examples, some other component, which may or may not be part of the system 10, may generate the test signal $SIG_{TEST}$, in which case the test control circuitry 140 may control the sending of the test signal $SIG_{TEST}$ by communicating to the other component that the test is to begin or end.

[II. Example Method]

Figure 5:
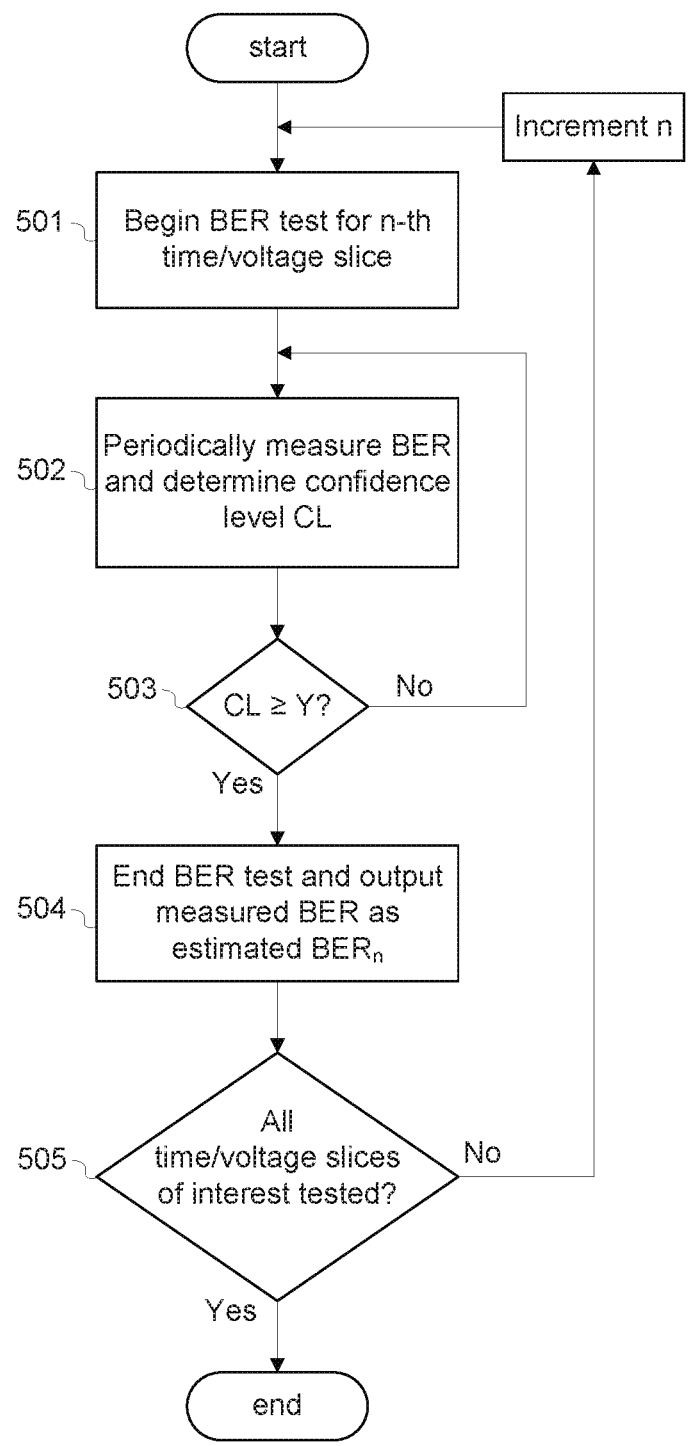
FIG. 5 is a process flow chart illustrating an example method of controlling a margining operation.

FIG. 5 illustrates an example method of controlling a margining operation. On a first iteration, n may be initialized to 1 prior to performing block 501. In block 501, a BER test for an n-th time/voltage slice is begun. Beginning the BER test may include, for example, causing timing and voltage parameters of a slicer to be set based on the n-th time/voltage slice, causing a test signal to be sent to the slicer, and starting the detection of errors E and counting of bits N.

In block 502, $\widehat{BER}_n$ is periodically measured and the confidence level $CL_n$ is periodically determined. Measuring $\widehat{BER}_n$ may include dividing the number of errors received thus far $E_n$ by the total bits received thus far $N_n$.

In block 503 it is determined whether the confidence level $CL_n$ is greater than or equal to a threshold value Y; if so, the process proceeds to block 503 and if not the process returns to block 502.

In block 504 the BER test is ended and the most recent value of the measured $\widehat{BER}_n$ is output as the estimated $BER_n$ for the n-th time/voltage slice.

In block 505 it is determined whether all of the time/voltage slices of interest have been tested. If not, the process returns to block 501, with n being incremented. If all of the time/voltage slices of interest have been tested, then the process ends.

[III. Example Non-Transitory Machine Readable Medium]

Figure 6:
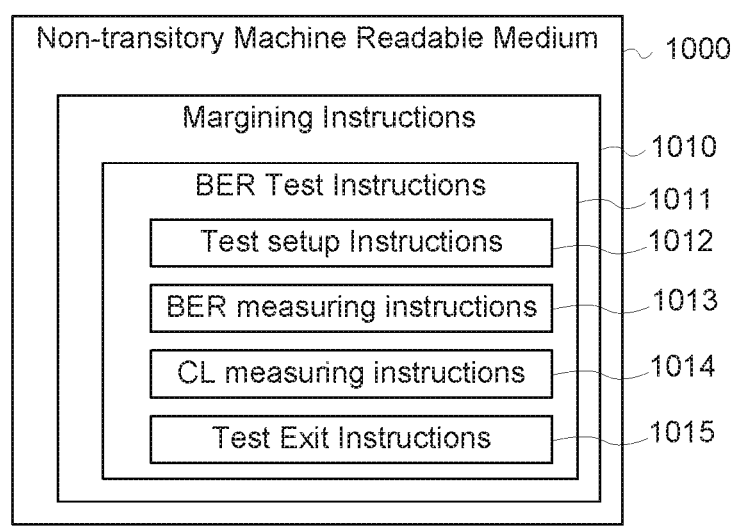
FIG. 6 is a block diagram illustrating an example non-transitory machine readable medium that stores margining instructions.

FIG. 6 illustrates an example non-transitory machine readable medium 1000. The non-transitory machine readable medium 1000 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The non-transitory machine readable medium 1000 may include margining instructions 1010 to perform a margining operation. The margining instructions 1010 may be instructions that, when executed by processing circuitry, cause the processing circuitry to perform some or all of the operations described herein in relation to a margining operation.

For example, the margining instructions 1010 may include BER test instructions 1011 for performing a BER test for a time/voltage slice. The margining instructions 1010 may further include instructions to execute the BER test instructions 1011 for each of a plurality of time/voltage slices, thereby causing the BER test to be performed for the plurality of time/voltage slices.

The BER test instructions 1011 may include instructions to perform a BER test. The BER test instructions 1011 may be instructions that, when executed by processing circuitry, cause the processing circuitry to perform some or all of the operations described herein in relation to a BER test operation. For example, the BER test instructions 1011 may include test setup instructions 1012, BER measuring instructions 1013, CL measuring instructions 1014, and test exit instructions 1015. The test setup instructions 1012 may include instructions to cause timing and voltage parameters of a slicer to be set based on a time/voltage slice that is being tested. The BER measuring instructions 1013 may include instructions to detect errors $E_i$ and count the total number of bits $N_i$ and to periodically measure $$\widehat{BER}_i = \frac{E_i}{N_i}.$$

The CL measuring instructions 1014 may include instructions to periodically determine a confidence level $CL_i$ for the measured $\widehat{BER}_i$. The test exit instructions 1015 may include instructions to apply exit criteria to determine when the test should be ended, where applying the exit criteria may include determining whether the confidence level $CL_i$ is greater than or equal to a threshold value Y.

While the above disclosure has been shown and described with reference to the foregoing examples, it should be understood that other forms, details, and implementations may be made without departing from the spirit and scope of this disclosure.

What is claimed is:

1. A communications device comprising:
   a slicer that is to generate a digital output signal by thresholding a received signal according to variably set timing and voltage parameters; and
   testing circuitry that is to determine expected bit error ratios for multiple time-voltage slices by performing test operations corresponding respectively to the multiple time-voltage slices, each of the test operations comprising:
   setting the timing and voltage parameters of the slicer based on the corresponding time-voltage slice,
   periodically measuring a bit error ratio based on the digital output signal and determining a confidence level for the measured bit error ratio, and
   in response to the determined confidence level equaling or exceeding a specified value, designating a current value of the measured bit-error ratio as the expected bit error ratio for the corresponding time-voltage slice and ending the test operation.

2. The communications device of claim 1,
   wherein the testing circuitry is to detect erroneous bits based on the digital output signal, and
   each of the test operations comprises measuring the bit error ratio by dividing a number of erroneous bits detected since a start of the test operation by a total number of bits received since the start of the test operation.

3. The communications device of claim 1,
   wherein the testing circuitry includes:
   first logic to detect erroneous bits based on the digital output signal by comparing received bits to trusted bits,
   a first counter coupled to the first logic and configured to increment each time the first logic detects an erroneous bit, and
   a second counter configured to increment for each received bit, and
   each of the test operations comprises:
   resetting the first and second counters at a start of the test operation, and
   determining the measured bit error ratio by dividing a current value of the first counter by a current value of the second counter.

4. The communications device of claim 1,
   wherein the testing circuitry is to determine the confidence level of the measured bit error ratio based on the binomial distribution with a total number of bits and a number of errors as inputs and the measured bit error ratio as an individual event probability.

5. The communications device of claim 1,
   wherein each of the test operations further comprises, in response to a total number of bits in the digital output signal meeting a second criterion, ending the test operation.

6. The communications device of claim 5,
   wherein each of the test operations further comprises, when the test operation is ended in response to the total number of bits in the digital output signal meeting the second criterion, designating a current value of the measured bit-error ratio as the bit error ratio for the corresponding time-voltage slice and associating a current confidence level with the bit error ratio for the corresponding time-voltage slice.

7. The communications device of claim 1, further comprising:
   a plurality of slicers, including the slicer, that are to generate respective digital output signals by thresholding the received signal according to respective timing and voltage parameters;
   a decoder circuit that outputs received bits by decoding the digital output signals of the plurality of slicers;
   wherein each of the test operations further comprises setting the timing and voltage parameters of each of the plurality of slicers based on the corresponding time-voltage slice.

8. The communications device of claim 1,
   wherein the slicer and the testing circuitry are formed on the same integrated circuit as one another.

9. A non-transitory computer readable medium storing instructions that, when executed by a computing device, cause the computing device to:
   margin a receiver of a communications device by performing bit error ratio test operations corresponding respectively to multiple time-voltage slices, each of the bit error ratio test operations comprising:
   setting timing and voltage parameters of a slicer of the communications device based on the corresponding time-voltage slice,
   periodically measuring a bit error ratio based on a digital output signal of the slicer and determining a confidence level for the measured bit error ratio, and
   in response to the determined confidence level satisfying a predetermined criterion, designating a current value of the measured bit-error ratio as an expected bit error ratio for the corresponding time-voltage slice and ending the test operation.

10. The non-transitory computer readable medium of claim 9, wherein the instructions, when executed by the computing device, further cause the computing device to:
    detect erroneous bits based on the digital output signal,
    wherein each of the bit error ratio test operations comprises determining the measured bit error ratio by dividing a number of erroneous bits detected since a start of the test operation by a total number of bits received since the start of the test operation.

11. The non-transitory computer readable medium of claim 9,
    wherein each of the bit error ratio test operations comprises determining the confidence level of the measured bit error ratio based on the binomial distribution with a total number of bits and a number of errors as inputs and the measured bit error ratio as an individual event probability.

12. The non-transitory computer readable medium of claim 9, wherein each of the bit error ratio test operations comprises, in response to a total number of bits in the digital output signal meeting a second criterion, ending the test operation.

13. The non-transitory computer readable medium of claim 10,
wherein each of the bit error ratio test operations comprises, when the test operation is ended in response to the total number of bits in the digital output signal meeting the second criterion, designating a current value of the measured bit-error ratio as the bit error ratio for the corresponding time-voltage slice and associating a current confidence level with the bit error ratio for the corresponding time-voltage slice.

14. The non-transitory computer readable medium of claim 9,
wherein, when the communications device includes a plurality of slicers, each of the bit error ratio test operations comprises, setting the timing and voltage parameters of each of the plurality of slicers based on the corresponding time-voltage slice.

15. A system, comprising:
a communications device that includes a slicer that is to generate a digital output signal by thresholding a received signal according to variably set timing and voltage parameters; and
a testing device that includes testing circuitry that is to determine expected bit error ratios for multiple time-voltage slices by performing test operations corresponding respectively to the multiple time-voltage slices, each of the test operations comprising:
setting the timing and voltage parameters of the slicer based on the corresponding time-voltage slice,
periodically measuring a bit error ratio based on the digital output signal and determining a confidence level for the measured bit error ratio, and
in response to the determined confidence level satisfying a predetermined criterion, designating a current value of the measured bit-error ratio as the expected bit error ratio for the corresponding time-voltage slice and ending the test operation.

16. The system of claim 15,
wherein the testing device is included in a same chassis as the communications device.

17. The system of claim 16
wherein the slicer and the testing circuitry are formed on the same integrated circuit as one another.

18. The system of claim 15,
wherein the testing device is included in a different chassis than the communications device.

19. The system of claim 15,
wherein the testing circuitry comprises a processor connected to a non-transitory computer readable medium that stores program code that, when executed by the processor, causes the testing circuitry to perform the test operations.

20. The system of claim 15,
wherein the testing circuitry comprises an application specific integrated circuit that performs the test operations.

* * * * *